United States Patent [19]

Bopp

[11] 4,325,470

[45] Apr. 20, 1982

[54] HOIST OVERLOAD CLUTCH

[75] Inventor: Alan L. Bopp, Lexington, Ky.

[73] Assignee: Eaton Corporation, Cleveland, Ohio

[21] Appl. No.: 121,932

[22] Filed: Feb. 15, 1980

[51] Int. Cl.[3] .................... F16D 13/30; F16D 67/02

[52] U.S. Cl. .................................. 192/16; 192/56 R; 192/95

[58] Field of Search ............... 192/14, 15, 18 R, 12 B, 192/56 R, 70.27, 16, 95; 254/350, 368, 346, 347

[56] References Cited

U.S. PATENT DOCUMENTS

| | | | |
|---|---|---|---|
| 2,829,538 | 4/1958 | Mueller | 192/95 X |
| 3,021,932 | 2/1962 | Becknell | 192/70.13 X |
| 3,756,359 | 9/1973 | Suez et al. | 192/16 |
| 4,156,521 | 5/1979 | Harman | 192/16 X |
| 4,251,060 | 2/1981 | Suzuki et al. | 192/16 X |

*Primary Examiner*—George H. Krizmanich
*Attorney, Agent, or Firm*—C. H. Grace; F. M. Sajovec

[57] ABSTRACT

A ratchet lever hoist (10) which includes an overload clutch (19) enclosed within the hoist handwheel (16). The handwheel is driven through a spline connection with the input drive hub (24) of the hoist, and carries a plurality of first clutch disks 94. Second clutch disks (100) are carried by a load brake drive member (34) and frictionally engage the clutch disks (94) through friction disks (106) bonded to the second clutch disks (100). The clutch is preloaded to a torque capacity corresponding to the rated load of the hoist or a predetermined value over the rated load, such that the clutch will slip, preventing rotation of the load brake drive member when the torque capacity of the clutch is exceeded.

5 Claims, 2 Drawing Figures

HOIST OVERLOAD CLUTCH

The present invention relates to hoists, and more particularly to an overload clutch for a ratchet lever hoist.

Ratchet lever hoists employing Weston type load brakes are well known in the art, as illustrated by U.S. Pat. No. 4,156,521, and others. Hoists employing both Weston type load brakes and overload clutches which prevent the lifting of a load heavier than a predetermined load capacity for a given hoist, are also well known as shown by U.S. Pat. No. 2,501,096.

Ratchet lever hoists are used for both hoisting and pulling functions, and they are often used outdoors under adverse conditions. While it is desirable in many applications to incorporate a device which will prevent the lifting or pulling of a load beyond the hoist's capacity it is often impractical to include an overload clutch in a ratchet lever hoist, either because of cost considerations or because the applications for which the hoist is to be used does not lend itself to the use of overload clutch.

In order to provide a ratchet lever hoist of maximum versatility, it is an object of this invention to provide an overload preventing device for a ratchet lever hoist which can be applied to the hoist as an optional feature, thus permitting the sale of a basic hoist unit without an overload clutch, but making it possible to add a clutch only if it is needed in a customer's particular application.

In order to meet the above objective the present invention provides an overload clutch structure which is incorporated entirely within a handwheel normally included in a ratchet lever hoist such that an overload prevention feature can be added to a basic hoist unit simply by replacing the clutch handwheel with the invention overload clutch structure or by replacing a minimum number of additional parts. This conversion can be made at the point of sale of the hoist or the conversion can be made in the field if the requirements of a particular job make it desirable to add an overload prevention device.

Other objects and advantages of the invention will become apparent from the following description when taken in connection with the following drawings, wherein.

Figure 1:
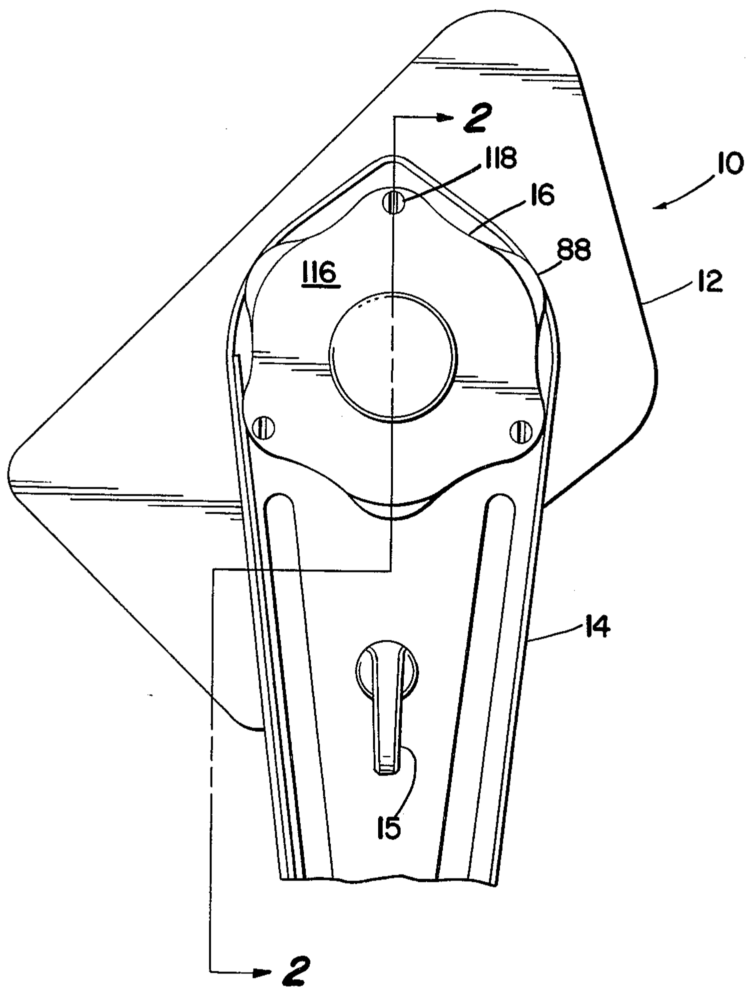
FIG. 1 is a elevation view of a ratchet lever hoist.

Referring to the drawings, a ratchet lever hoist 10 is illustrated including a housing 12, an input drive lever 14, and a handwheel 16. The general arrangement of ratchet lever hoists is well known in the art and will not be discussed in detail herein.

Figure 2:
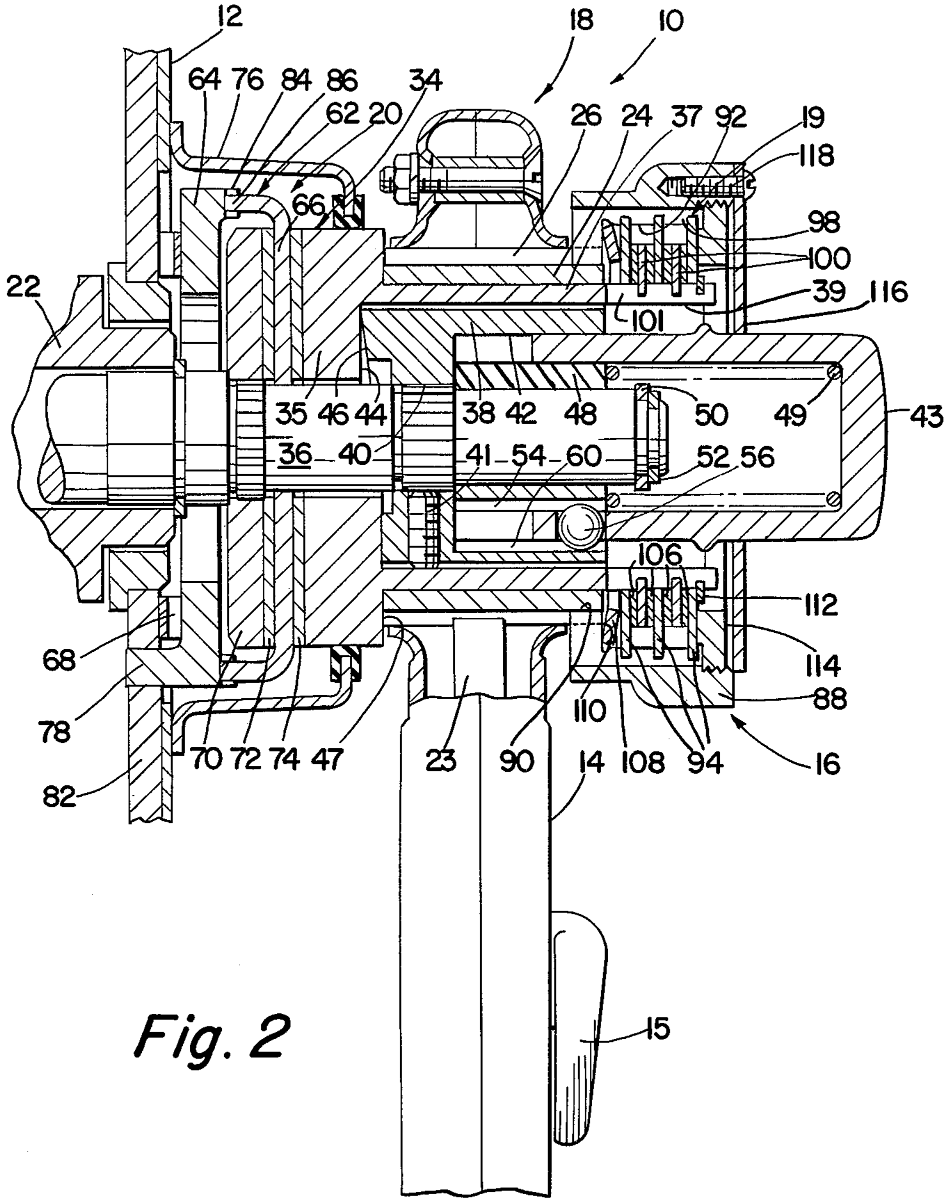
FIG. 2 is a sectional view taken along line 2—2 of FIG. 1.

Referring particularly to FIG. 2, the hoist 10 includes an input section 18, a load brake section 20, and an output sprocket 22. The input section 18 includes the input drive lever 14 which is preferably drivingly connected through a known pawl mechanism 23 to an input drive hub 24 which includes radial ratchet teeth 26 engageable with the pawl mechanism.

Input hub 24 has a bore formed therein for receiving a drive hub or cam member 34, which includes a cam section 35 piloted on a drive shaft 36 and an elongated torque tube section 37 on which the input hub is piloted. A cam member 38 is received within a bore 39 formed in the torque tube section and is splined to the drive shaft 36 at 40. The cam member is retained on the shaft by a set screw 41, and has a bore 42 formed therein to slidingly receive the open end of a cup-shaped plunger member 43. Cooperating cam surfaces 44 and 46 are formed on the cam section 35 and the cam 38 respectively as part of the Weston brake structure which will be described in further detail later in this description. The input lever 14 is axially retained between a shoulder 47 formed on the drive cam member 34, and the handwheel 16.

A collar 48 is received over shaft 36, and a compression spring 49 is received within the plunger 43 and acts between the inside wall of the plunger and an end of the collar. A retaining washer 50, which is received on a reduced diameter end portion of the shaft 36 and is retained by a retaining ring 52, prevents outward movement of the collar 48 beyond the end of the shaft.

The collar 48 has a plurality of helical grooves 54 formed in its outer surface for receiving balls 56, which are retained in transverse holes formed through the side wall of plunger 46 and engageable with axial slots 60 formed in the central bore 42 of the cam 38. It should be noted that in the embodiment illustrated, the structure which includes the plunger 43, the balls 56, grooves 54, slots 60 and spring 49 define a means for releasing a locked condition of the hoist load brake as described in U.S. Pat. No. 4,156,521. It will become apparent from the following description that such structure forms no part of the present invention, and that the invention is equally applicable to a ratchet lever hoist which does not include this feature.

The load brake section 20 includes a well-known Weston type brake comprising a ratchet assembly 62 which includes a ratchet disk 64, a ratchet cup 66, a load spring 68, a reaction plate 70, friction disks 72 and 74, drive cam 34, and a cover 76 fixed to the housing 12.

The ratchet disk 64 is secured against rotation relative to the housing 12 by means of lugs 78 (one shown) received in corresponding apertures formed in a side plate 82 of the housing 12. The ratchet disk includes annularly distributed ratchet teeth 84 which engage mating teeth 86 formed on the ratchet cup 66. The reaction plate 70 is splined to the shaft 36 and abuts a shoulder formed thereon. Friction disk 72 is received between the reaction plate 70 and the ratchet cup 66, and friction disk 74 is received between ratchet cup 66 and drive cam 34. The ratchet cup 66 is piloted on the shaft 36.

The output sprocket 22, which is partially shown in FIG. 2, can be attached directly to the shaft 36, or it can be indirectly connected through a gear train (not shown) in a known manner. As is well known in the art, the sprocket 22 can be of the roller chain type or of the link type to accommodate either of the two common forms of hoist load chains.

In accordance with the invention, the input section 18 includes an overload clutch assembly, designated generally by the numeral 19 which is entirely enclosed within the handwheel 16.

The handwheel 16 comprises a cylindrical housing 88 having a relatively small inside diameter portion 90 which is in toothed engagement with the ratchet teeth 26, and a relatively large inside diameter portion 92 which receives a plurality of first or outer clutch disks 94. Each of the clutch disks 94 includes a plurality of radial ears which are received in axially extending slots 98 formed in the housing 88 in a conventional manner.

A plurality of second or inner clutch disks 100, each having a plurality of radial ears which are received in slots 101, are received in the torque tube portion 37 of the cam member 34.

The inner clutch disks 100 have disks of friction material 106 bonded thereto, and the inner and outer clutch disks are interdigitated in a conventional manner. The clutch assembly 19 is preloaded by means of a spring washer 108 received between a wall 110 formed at the intersection of the small diameter portion 90 of the housing 88 with the large diameter portion 92, and an end one of the outer clutch disks 94. The spring washer 108 in combination with a spanner nut 114, applies a predetermined preload to the clutch assembly. The spanner nut 114 is threaded into a counterbore formed in the outer end of the housing 88 and includes axial holes (not shown) for the application of a spanner wrench to effect installation and removal of the nut within the housing. A retaining ring 112 received in a groove formed adjacent the end of the torque tube portion 37, retains the handwheel 16.

A cover plate 116, having a central hole formed therein to clear the plunger 43, is attached to the outer end face of the housing 88 by means of screws 118 or the like, to enclose the clutch assembly.

When the hoist 10 is fully assembled except for the installation of the cover plate 116, the spanner nut 114 is threaded into the housing 88 by an amount sufficient to apply a predetermined preload to the overload clutch, to set the torque capacity of the clutch at a value corresponding to the rated load of the hoist, or a predetermined value slightly higher than the rated load.

When a load is to be lifted by the hoist 10, the pawl mechanism 23 is engaged by moving a selector 15 to the "raise" position and rotating the hand lever 14 relative to the housing 12 in the appropriate direction. The pawl mechanism will engage the ratchet teeth 26 on the input drive hub 24 to rotate the hub. Rotation of the hub 24 will also cause the handwheel 16 to rotate by virtue of the spline connection at the diameter 90 of the housing 88. The input torque thus applied is then transmitted from first clutch disks 94, through the friction disks 106, to the second clutch disks 100, thus rotating the drive cam 34. As the cam 34 rotates with respect to the cam member 38 the sliding engagement of the abutting cam surfaces 44 and 46 causes the drive cam 34 to move to the left as shown in FIG. 2 thereby axially loading the friction disks 72 and 74 against the reaction plate 70 and the ratchet cup 66. Since the reaction plate is fixed to the drive shaft 36, a frictional driving connection is effected between the input hub 24 and the drive shaft 36, while the ratchet teeth 86 of ratchet cup 66 ratchet over the back sides of ratchet teeth 84 on the spring-loaded ratchet disk 64. When a load is to be lowered by operation of the hand lever 14, the cam 34 is moved to the right to effectively disengage the reaction plate 70 from the ratchet cup 66 to allow the shaft 36 to move in the lowering direction. However, whenever the weight of the load tends to allow the output shaft to overrun the movement of the hand lever, the cam 34 will again move to left, locking the reaction plate to the ratchet cup whereupon the ratchet teeth 86 will engage the front faces of teeth 84 to effectively lock the shaft 36 to the housing 12 through ratchet disk 64. If the load acting on the output sprocket should exceed the capacity of the overload clutch 19, as set by the preload applied thereto, slippage will occur between the clutch disks 94 and 100 when the handle 14 is rotated, thus preventing the load from being picked up.

I claim:

1. In a ratchet lever hoist comprisng a housing, a drive hub supported for rotation relative to said housing, an input hand lever mounted for rotation relative to said housing, a load supporting output member mounted for rotation within said housing, means connecting said drive hub and said output member, ratchet drive means operatively connecting said hand lever and said drive hub, and a handwheel operatively connected to said drive hub; the improvement including an input hub member comprising a tube received over a portion of said drive hub and including teeth formed on the outer diameter thereof for engagement by said ratchet drive means; and a clutch assembly received within said handwheel, said clutch assembly comprising a plurality of first clutch disks mounted for rotation with said handwheel, a plurality of second clutch disks mounted for rotation with said drive hub, and a plurality of friction disks interleaved between said first and second clutch disks; said handwheel comprises a cylindrical housing member having a stepped bore comprising a first relatively small diameter and a second relatively large diameter, and internal teeth formed in said first diameter and in engagement with the teeth formed on said tube.

2. Apparatus as claimed in claim 1, in which said drive hub includes an elongated cylindrical portion on which said input hub member is received, said cylindrical portion having a plurality of slots formed in one end thereof for receiving said second clutch disks, and retaining means received adjacent said one end for retaining said handwheel axially.

3. Apparatus as claimed in claim 2, wherein said handwheel has a counterbore formed in an end thereof, said clutch assembly further comprising a spring washer received between the wall defined by the intersection of said first and second diameters and an end one of said clutch disks, and a nut threaded into said counterbore and having a face in engagement with an opposite end one of said clutch disks.

4. Apparatus as claimed in claim 3, in which said handwheel includes a cover plate attached thereto and substantially enclosing the counterbored end thereof.

5. Apparatus as claimed in claim 1, in which said hoist includes a Weston load brake, said drive hub defining a drive cam of said load brake.

* * * * *